No. 612,633. Patented Oct. 18, 1898.
C. SANDFORD.
LEG FLY NET.
(Application filed Oct. 16, 1897.)

(No Model.)

WITNESSES:
Wm. T. Bell.
Louise Snyder.

INVENTOR:
Charles Sandford
BY Partner & Co
ATTORNEYS

UNITED STATES PATENT OFFICE.

CHARLES SANDFORD, OF PATERSON, NEW JERSEY.

LEG FLY-NET.

SPECIFICATION forming part of Letters Patent No. 612,633, dated October 18, 1898.

Application filed October 16, 1897. Serial No. 655,456. (No model.)

*To all whom it may concern:*

Be it known that I, CHARLES SANDFORD, a citizen of the United States, residing in Paterson, county of Passaic, and State of New Jersey, have invented certain new and useful Improvements in Leg Fly-Nets; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in leg fly-nets, particularly adapted to use in connection with the legs of horses and cattle; and its object is to provide a leg fly-net of simple, strong, and durable construction and which can be quickly and readily attached to and detached from the leg of the animal and when so attached protects the said leg from annoyance of flies, mosquitos, &c., which commonly gather about the leg and fetlock and cause the animal to stamp and waste nervous force. Said fly-net fits closely upon the leg of the animal and yet permits perspiration or water (in case of rain) to run down the leg, thus preventing the accumulation of said perspiration or water upon said fly-net and unnecessarily moisten the same.

The invention consists in the improved fly-net, its grooved or corrugated padding, and in the combination and arrangements of the various parts, substantially as will be hereinafter more fully described, and finally embodied in the clauses of the claim.

Figure 1:
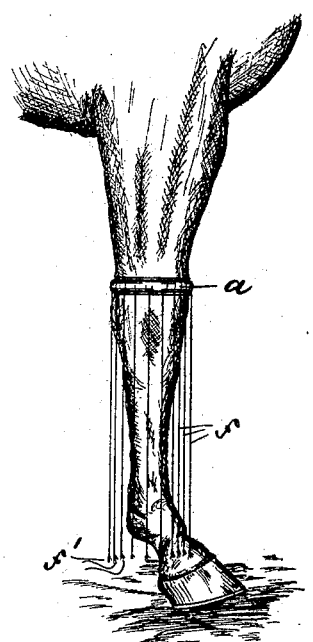
Figure 2:
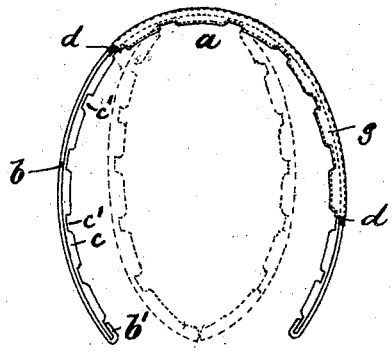
Figure 3:
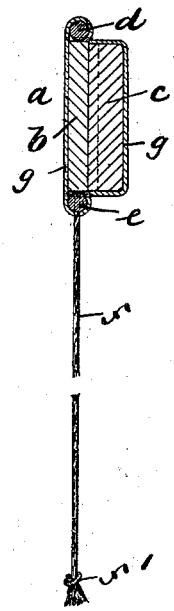

In the accompanying drawings, in which like letters of reference indicate corresponding parts in each of the several views, Figure 1 is a side elevation of my improved fly-net as it appears in use attached to the leg of a horse; Fig. 2, an enlarged top plan view, partly broken away, of the padded spring-band; and Fig. 3, an enlarged sectional view through the fly-net.

In said drawings, $a$ represents the clamping or spring band, consisting of a strip of spring metal $b$, and having its normal shape like that shown in Fig. 2 in dotted lines for approximately conforming to the leg of the animal, and having each free end bent inward upon itself, as at $b'$, adapted to securely clamp the ends of the padding $c$ to and within the said spring metal strip. Said padding is preferably of felt and is provided with a series of vertical grooves or corrugations $c'$ $c'$, arranged at suitable intervals and adapted to form openings or channels, allowing the perspiration or water to run down the leg of the animal.

On the upper edge of the spring-metal strip $b$ is arranged a cord or string $d$, while a like cord or string $e$ is arranged on the lower edge and extending the entire length thereof.

To the lower cord or string $e$ are secured in any desired manner a series of danglers or pendants $f$, knotted at or near their lower portions, as at $f'$, and of a length to approximately cover the lower portion of the leg of the animal on which said fly-net is to be used.

The spring-metal strip $b$, the padding $c$, and the upper and lower cords or strings $d$ and $e$ are inclosed by a wrapper $g$ of canvas or of any suitable material, and which wrapper is secured to said padding-strings by stitches or by any other well-known fastening means.

The leg-nets may be carried along in the carriage, and when the horse is to be left standing for a shorter or longer time said nets are adjusted to the legs, and the slightest movement of said legs will cause the pendants to dangle, and hence protect the fetlock and legs of the horse from the flies, mosquitos, &c. When it is desired to drive on, the nets may either remain on the legs of the horse or may be removed by simply pulling upon the clamping-band, and thus the adjustment and removal produce very slight hindrance, and on the other hand the protection which they afford will be found to be of great advantage in keeping the horse from wasting nervous force and becoming overheated.

It must be remarked that the clamping-band on account of its spring-power or elasticity will securely hold the fly-net upon the horse's leg without exerting any undue strain or pressure upon said leg.

I do not intend to limit myself to the precise construction shown and described, as various alterations can be made without changing the scope of my invention; but

What I claim as new, and desire to secure by Letters Patent, is—

1. A leg fly-net, comprising a spring-band open at one side and substantially conforming in shape to the leg, a padding on the inside of said spring-band and provided with a series of approximately vertical grooves or corrugations, and a series of pendants or danglers connected with said spring-band and padding and depending therefrom, substantially as and for the purposes set forth.

2. A leg fly-net, comprising a spring-band open at one side and substantially conforming in shape to the leg and having its free ends bent inward upon themselves, a padding on the inner portion of said spring-band and provided with a series of approximately vertical grooves or corrugations, and having its ends secured to said spring-band by means of said bent-over portions, and a series of pendants or danglers carried by said spring-band and padding, substantially as and for the purposes described.

3. A leg fly-net, comprising a spring-band open at one side and substantially conforming in shape to the leg, a padding on the inner portion of the spring-band and provided with a series of approximately vertical grooves or corrugations, a covering or wrapper of suitable material inclosing said spring-band and padding, and a series of pendants or danglers carried by said wrapper and depending therefrom, substantially as and for the purposes described.

4. A leg fly-net, comprising a spring-band open at one side and substantially conforming in shape to the leg, a padding on the inner portion of said spring-band and provided with a series of approximately vertical grooves or corrugations, a cord or string on the upper edge of said spring-band, a cord or string on the lower edge of said spring-band, a covering or wrapper inclosing said spring-band, padding and cords or strings, and a series of pendants or danglers depending therefrom, substantially as and for the purpose described.

In testimony that I claim the foregoing I have hereunto set my hand this 7th day of October, 1897.

CHARLES SANDFORD.

Witnesses:
 ALFRED GARTNER,
 LOUISE SNYDER.